United States Patent [19]

Rose

[11] 4,048,073
[45] Sept. 13, 1977

[54] FILTER BED ASSEMBLY

[75] Inventor: Lawrence J. Rose, Littleton, Colo.

[73] Assignee: Helix Technology Corporation, Waltham, Mass.

[21] Appl. No.: 662,777

[22] Filed: Mar. 1, 1976

[51] Int. Cl.² .............................................. B01D 29/06
[52] U.S. Cl. ..................................... 210/284; 55/484; 55/518; 210/286; 210/484
[58] Field of Search .................... 55/74, 484, 515, 516, 55/518, 521; 210/226, 228, 284, 285, 286, 493, 317, 484

[56] References Cited

U.S. PATENT DOCUMENTS

| 2,944,009 | 7/1960 | Huntley et al. | 210/286 |
| 3,280,985 | 10/1966 | Czerwonka | 210/493 R |
| 3,344,590 | 10/1967 | Smith et al. | 55/484 |
| 3,350,860 | 11/1967 | Grassel et al. | 55/484 |

Primary Examiner—Thomas G. Wyse
Assistant Examiner—Ivars Cintins
Attorney, Agent, or Firm—Griffin, Branigan and Butler

[57] ABSTRACT

A filter-bed assembly comprises two adjacent beds each including adsorbent materials held between perforate sheets. The perforate sheets form the sides of the beds and have upstanding pleats therein to add rigidity thereto and to serve as spacers between the beds. Some of the pleats extend into the adsorbent material, and others of the pleats extend away from the adsorbent material toward the adjacent bed.

9 Claims, 4 Drawing Figures

FILTER BED ASSEMBLY

BACKGROUND OF THE INVENTION

This invention relates generally to filtration beds, and more specifically to adsorbent filtration beds of the type used in radioactive-gas filtration systems.

In the manufacture of adsorbent filtration beds, such as those including charcoal or silver zeolite, which are used in radioactive-gas filtration systems, one requirement is that a close tolerance of spacing between screens, or perforate sheets, which comprise the beds be maintained. The perforate sheets are often as wide as 31 inches so that reinforcing is required to give them structural rigidity and to maintain desired spacing tolerances.

Generally, this is done by putting Z-bar stiffeners in the beds as is depicted in FIG. 1 and described below. The perforate sheets are spot-welded to the end sections of the Z-bar stiffeners. However, a problem with using Z-bar stiffeners is that the end sections thereof create blank areas on the screens which are undesirable because they necessitate making the filter beds larger than is necessary to have the required surface areas. Thus, it is an object of this invention to provide stiffeners for giving rigidity to perforated sheets or screens of filtration beds and for maintaining spacings therebetween which do not create blank areas.

It is known in the prior art to employ pleats, or folds, in screens to space the screens from one another, such an arrangement being disclosed in U.S. Pat. No. 3,344,590 to Smith et al. However, heretofore, the use of such pleats has been limited to spacers and they have been mounted at lateral edges of filtration members. It is yet another object of this invention, therefore, to employ pleats in such a manner that they add rigidity to otherwise flat perforate sheets of filtration beds across unsupported spans thereof.

SUMMARY OF THE INVENTION

According to principles of this invention, folded upstanding "flutes" or pleats in a perforate sheets, or screens of filtration beds substitute for Z-bars. The flutes extend across unsupported spans of otherwise flat screens which are placed in an opening of a filter frame. There are two types of pleats: straight pleats with form spacers between beds, and creased pleats which extend into the beds and have zig-zag cross-sections. The straight pleats or flutes are used for spacing the beds from one another. The primary function of the creased pleats is to impart rigidity to the screens, but they have a secondary function of causing fluid to flow along a tortuous path through adsorbent material.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILS OF THE INVENTION

Figure 1:
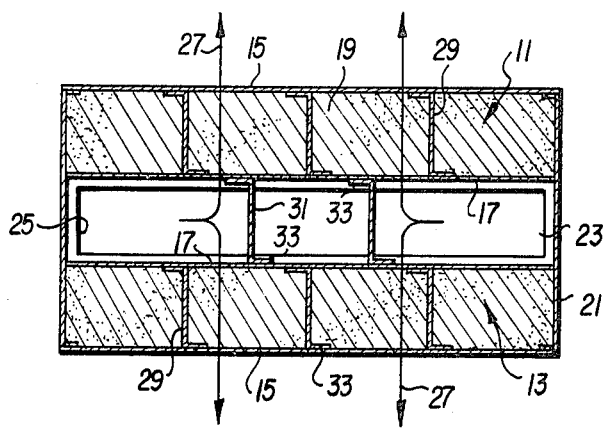
FIG. 1 is a sectional view of a prior-art filtration bed assembly.

In the prior-art filtration bed assembly of FIG. 1, beds 11 and 13 each respectively comprise perforate sheets, or screens 15 and 17 and adsorbent material 19. The beds 11 and 13 are held within an impervious frame 21.

Fluid to be filtered is introduced into a space 23 through an opening 25 and passes out through the beds 11 and 13 as indicated by arrows 27. Z-bars 29 are used to separate the screens 15 and 17 of the beds 11 and 13 appropriate distances from one another. In addition, Z-bars 31 are used to space the beds 11 and 13 appropriate distances from one another.

A problem with this prior art system is that where end sections 33 of the Z-bars 29 and 31 are attached to the screens 15 and 17 they form "blank" areas thereon which cannot be used for fluid flow. Thus, the width of the entire system must be enlarged to compensate for this.

Figure 2:
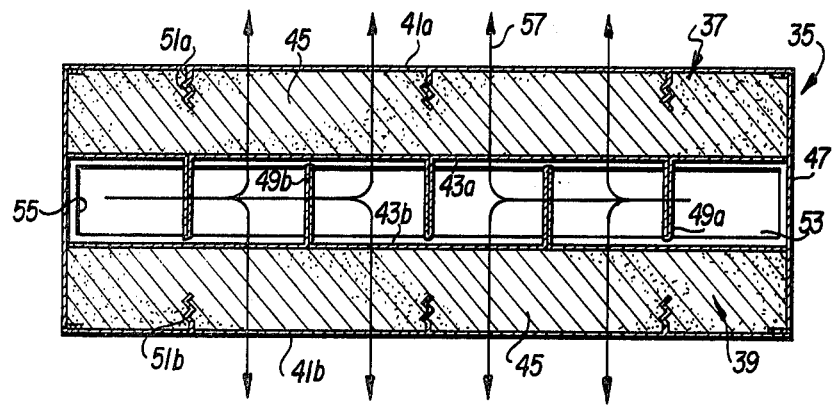
FIG. 2 is a sectional view of a filtration bed assembly employing principles of this invention.
Figure 3:
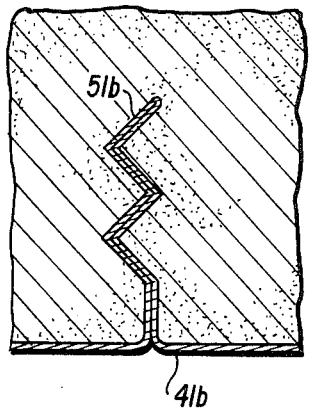
FIG. 3 is an enlarged cross-sectional view of a creased pleat of the filtration bed assembly of FIG. 2.
Figure 4:
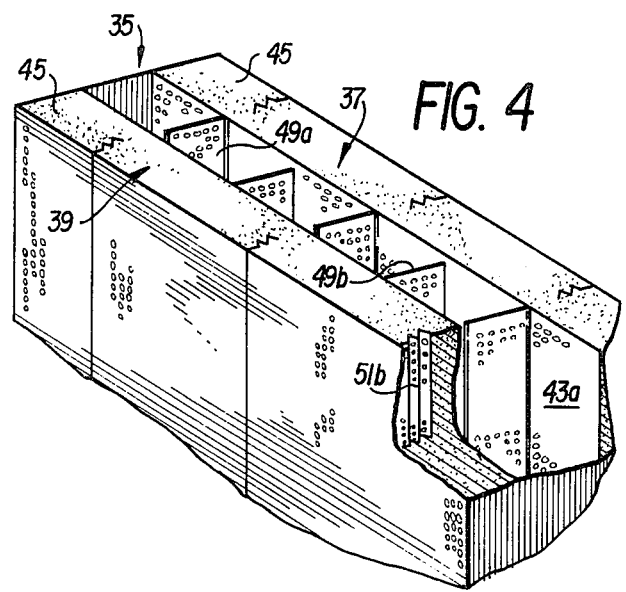
FIG. 4 is an isometric, sectional, partially-cutaway view of the filtration bed assembly of FIG. 2.

Turning next to this invention, with reference to FIGS. 2, 3 and 4, a filtration bed assembly 35 comprises two filtration beds 37 and 39. Each of the filtration beds 37 and 39 includes an outside perforate sheet or screen 41a,b and an inside screen 43a,b enclosing adsorbent materials 45. The screens 41a,b and 43a,b are attached at the perimeter edges thereof to an impervious frame 47. The inside screens 43a,b have straight, upstanding folded pleats 49a,b formed therein extending away from the adsorbent materials 45 toward the opposite filtration bed. These plates are formed by folding the screens 43a,b all the way across their widths.

Creased pleats 51a,b (shown in more detail in FIG. 3) are bent to have zig-zag cross-sections. These pleats extend perpendicularly away from the outside screens 41a,b into the adsorbent material 45 of the respective beds 37 and 39.

In operation, fluid to be filtered enters a space 53 between the filtration beds 37 and 39 via an inlet opening 55. This fluid travels along the paths indicated by arrows 57 through the filtration beds 37 and 39.

It will be appreciated by those skilled in the art that both the straight pleats 49a,b and the creased pleats 51a,b add rigidity to the screens 41a,b and 43a,b. By having added rigidity, these screens tend to stay in their desired positions. In addition, the straight pleats 49a,b are urged laterally by adsorbent material to have compression loads against adjacent beds. Thus, these pleats act as spacers between beds 37 and 39.

The zig-zag cross-sectional shapes of the creased pleats 51a,b in addition to adding rigidity to outside screens 41a,b cause flow of fluid in a meandering or tortuous manner through the beds 37 and 39 to improve operation of the beds.

An important feature of this invention is that since the pleats 49 and 51 are formed of screen material they are themselves perforate and allow the flow of fluid therethrough. Thus, they do not provide blank areas as do the Z-bars of FIG. 1.

The primary functions of the creased pleats 51a,b is to impart rigidity to the wide unsupported spans of the outside screens 41a,b, while the straight pleats 49a,b not only provide rigidity to the inside screens 41a,b but also help maintain the proper spacing between the two adsorbent beds 37 and 39.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

1. A filter bed assembly having a bed comprising:
    a frame for defining a space through which fluid to be filtered flows;
    an adsorbent material held between parallel perforate sheets, the perforate sheets being attached along perimeter edges thereof to said frame and having open spans extending across said space, each of the perforate sheets having a plurality of folded pleats extending across said open spans of the perforate sheets said pleats rising substantially perpendicularly outwardly from the remainder of said perforate sheets, the pleats in a first of said perforate sheets rising into said adsorbent material.

2. A filter bed assembly as in claim 1 where said pleats in said first perforate sheet are creased a plurality of times to form zig-zag cross-sections.

3. A filter bed assembly as in claim 2 wherein the pleats in a second of said perforate sheets rise away from said adsorbent material.

4. A filter bed assembly as in claim 1 wherein the pleats in a second of said perforate sheets rise away from said adsorbent material.

5. A filter bed assembly as in claim 4 wherein there are four parallel perforate sheets and said adsorbent material is positioned between a first outside sheet and the adjacent inside sheet and the other outside sheet and its adjacent inside sheet and wherein pleats in said inside sheets rise away from the adsorbent material held by sad inside sheets toward the other inside sheet to act as spacers between said inside sheets.

6. A filter bed assembly as in claim 5 wherein pleats in said outside perforate sheets rise into said adsorbent material.

7. A filter bed assembly as in claim 6 wherein said pleats in said outside perforate sheets are creased a plurality of times to form zig-zag cross-sectional shapes.

8. A filter bed assembly comprising:
    a frame for defining a space through which fluids to be filtered flow;
    first and second separate beds positioned in said space, said first and second separate beds each including an adsorbent material held between first and second parallel perforate sheets, said perforate sheets being attached along outer edges thereof to said frame, said first perforate sheets having first folded pleats therein, said first folded pleats extending approximately perpendicular to the plane of said first perforate sheets into said adsorbent material, said second perforate sheet having second folded pleats formed therein, said second folded pleats extending substantially perpendicular to the plane of said second perforate sheets away from said adsorbent material;
    the perforate sheets of said first and second beds being attached to said frame to be parallel to one another with the respective second perforate sheets being adjacent one another but spaced from one another a distance approximately equal to the lengths of said second folded pleats, said second folded pleats contacting the second perforate sheets of the other respective beds to maintain said spacing.

9. A filter bed assembly as in claim 8 wherein said first folded pleats are creased to form zig-zag cross-sections.

* * * * *